United States Patent [19]
Negishi

[11] Patent Number: 5,724,181
[45] Date of Patent: Mar. 3, 1998

[54] SIGHT SCOPE

[75] Inventor: Kiyoshi Negishi, Tokyo, Japan

[73] Assignee: Asia Optical Co., Ltd., Tokyo, Japan

[21] Appl. No.: 796,238

[22] Filed: Feb. 7, 1997

[30] Foreign Application Priority Data

Dec. 18, 1996 [JP] Japan .................. 8-354080

[51] Int. Cl.⁶ .............. G02B 23/00; G02B 26/02; F41G 1/32
[52] U.S. Cl. .............. 359/428; 359/399; 356/252; 33/241
[58] Field of Search ............ 359/353, 399–403, 359/405, 407, 409, 417–429, 223–226, 806, 808, 811–813, 878–879, 827–830, 871–877; 356/141–153, 251–255; 248/477–485; 33/241–252; 42/100–103

[56] References Cited

U.S. PATENT DOCUMENTS

| | | | |
|---|---|---|---|
| 4,105,282 | 8/1978 | Schael | 359/428 |
| 4,167,333 | 9/1979 | Young et al. | 356/253 |
| 4,589,744 | 5/1986 | Kimura et al. | 359/428 |
| 5,052,782 | 10/1991 | Myer | 359/819 |
| 5,140,470 | 8/1992 | Luecke | 359/879 |
| 5,508,843 | 4/1996 | Tomita | 359/428 |
| 5,555,134 | 9/1996 | Hanke et al. | 359/819 |
| 5,653,034 | 8/1997 | Bindon | 359/353 |

*Primary Examiner*—Thong Nguyen
*Attorney, Agent, or Firm*—Fish & Richardson P.C.

[57] ABSTRACT

A semitransparent mirror is attached to a holder on its objective side and an LED (light source) is attached to the holder on its ocular side. The light from the LED is reflected by the semitransparent mirror and provided as an aiming point. A receiving recess having an inclined axis is formed in one end of the holder on the objective side. A resilient ring, the semitransparent mirror and a support ring are received in the receiving recess in this order. Three or more adjusting screws are equally spacedly arranged in the circumferential direction. By selectively tightening the adjusting screws, the inclination of the semitransparent mirror is adjusted.

3 Claims, 2 Drawing Sheets

SIGHT SCOPE

BACKGROUND OF THE INVENTION

This invention relates to a sight scope to be attached to a distance measuring equipment, an astronomical telescope, a gun and the like.

A sight scope disclosed in U.S. Pat. No. 5,508,843 includes an outer sleeve and an inner sleeve received in the outer sleeve. A semitransparent mirror is secured to an end portion of the inner sleeve on the objective side. A light source is secured to the other end of the inner sleeve on the ocular side. The light from the light source is caused to proceed towards the semitransparent mirror and reflected by the semitransparent mirror. The reflected light proceeds towards the ocular side along an axis of the inner sleeve and is provided as an aiming point. Inclination of the axis of the inner sleeve relative to an axis of the outer sleeve is adjusted by an adjusting mechanism. Owing to this adjustment, an optical axis of the reflected light can be made parallel or inclined at a desired angle with respect to a barrel of the gun to which the sight scope is attached.

However, since it is necessary for the above sight scope to have a complicated adjusting mechanism interposed between the outer sleeve and the inner sleeve in order to adjust the optical axis of the reflected light, cost is increased.

SUMMARY OF THE INVENTION

It is, therefore, an object of the present invention to provide a sight scope capable of adjusting an optical axis of a reflected light with a simple adjusting mechanism.

According to the present invention, there is provided a sight scope comprising:

(a) a sleeve-like holder;

(b) a semitransparent minor attached to the holder in such a way to be inclined relative to an axis of the holder;

(c) a light source attached to the holder at a location offset to an ocular side rather than the semitransparent mirror, light being emitted towards the semitransparent mirror from the light source, the light being reflected by the semitransparent mirror towards the ocular side generally along the axis of the holder and provided as an aiming point; and (d) an adjusting mechanism for adjusting inclination of the semitransparent mirror, the adjusting mechanism including:

(i) a receiving recess formed in an inner periphery of one end of the holder on an objective side, the receiving recess having a circular configuration in section, an axis of the receiving recess being inclined relative to the axis of the holder, the semitransparent mirror being received in the receiving recess, an annular step is formed at an innermost part of the receiving recess;

(ii) a resilient ring interposed between the semitransparent mirror and the step;

(iii) a support ting attached to the receiving recess and facing with a surface of the semitransparent mirror on the opposite side of the resilient ring, the support ring having three or more threaded through-holes equally spacedly arranged in a circumferential direction thereof; and (iv) three or more adjusting screws for threadingly engaging the three or more threaded through-holes respectively, one ends of the adjusting screws being faced with the semitransparent mirror.

DETAILED DESCRIPTION OF THE EMBODIMENT

Figure 1:
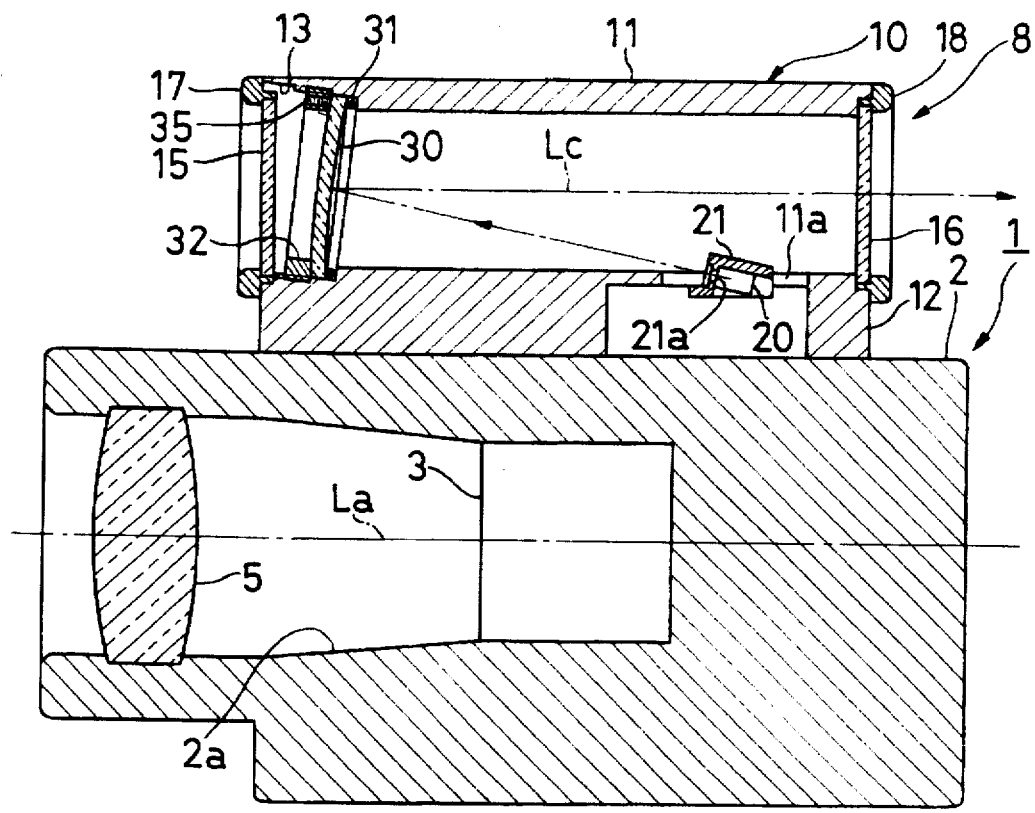
FIG. 1 is a vertical sectional view showing a distance measuring equipment attached With a sight scope according to the present invention.
Figure 2:
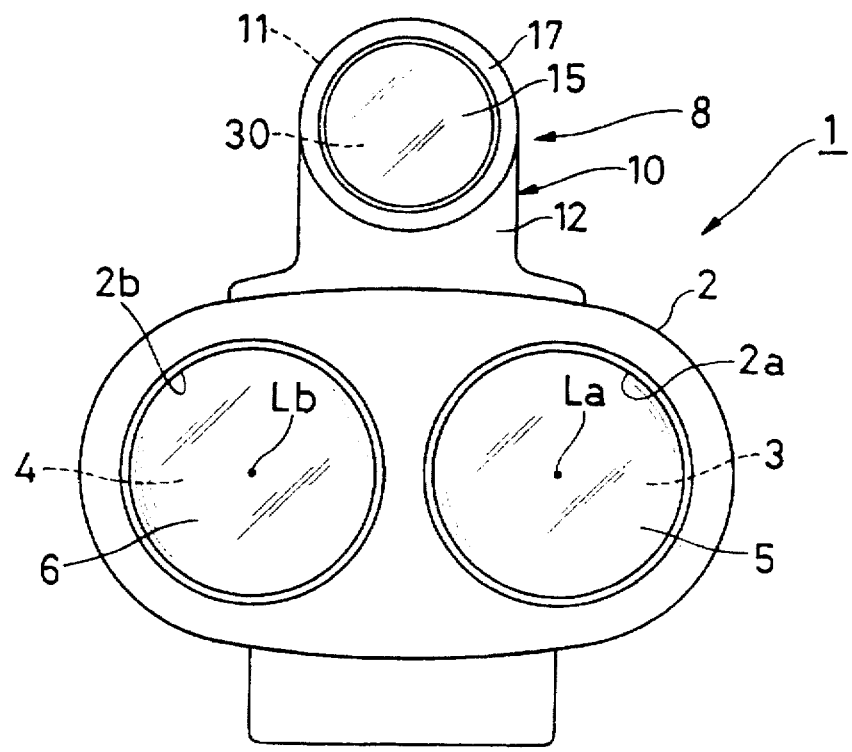
FIG. 2 is a front view of the distance measuring equipment of FIG. 1.

One embodiment of a sight scope according to the present invention will now be described with reference to the accompanying drawings, in which the sight scope is attached to a distance measuring equipment. As shown in FIGS. 1 and 2, a distance measuring equipment 1 includes a body 2. This body 2 has two elongated receiving spaces 2a and 2b which are in parallel relation. A laser oscillator 3 is disposed at an innermost part of the receiving space 2a, while a laser receiver 4 is disposed at an innermost part of the receiving space 2b. A convex lens 5 is attached to a front opening of the receiving space 2a, while another convex lens 6 is attached to a front opening of the receiving space 2b.

A laser beam from the oscillator 3 passes through the convex lens 5, then it is reflected by an object remote from the distance measuring equipment 1, and returned to the distance measuring equipment 1. The reflected laser beam passes through the convex lens 6 and enters the receiver 4. The time required for the laser beam to be received by the receiver 4 after it is emitted from the oscillator 3 is calculated by a computer not shown and the distance is calculated based on the time thus obtained.

An optical axis La of the outgoing laser beam and an optical axis Lb of an incoming laser beam are in parallel relation, with a high degree of accuracy.

A sight scope 8 is attached to an upper surface of the body 2. This sight scope 8 includes a sleeve-like holder 10. The holder 10 has a cylindrical portion 11, and a base portion 12 integral with a lower part of the cylindrical portion 11. The base portion 12 is secured to the upper surface of the body 2 by thread means or the like.

An axis of the cylindrical portion 11 of the holder 10 is in parallel relation to axes of the receiving spaces 2a and 2b of the body 2.

A transparent plate 15 is attached to an opening of the cylindrical portion 11 on the objective side, while another transparent plate 16 is attached to an opening of the cylindrical portion 11 on the ocular side. Owing to this arrangement, an internal space of the cylindrical portion 11 is closed. Those transparent plates 15 and 16 are secured to attachment tings 17 and 18 by adhesive or the like, respectively. The attachment rings 17 and 18 are attached to peripheral edges of the openings of the cylindrical portion 11 by adhesive or the like.

An attachment hole 11a is formed in a lower part of the cylindrical portion 11 on the ocular side. A light emitting diode, i.e., LED 20 (light source) is attached to the attachment hole 11a through an attachment 21. A through-hole 21a is formed in the attachment 21. The light from the LED 20 passes through this through-hole 21a and proceeds towards the objective side of the cylindrical portion 11.

Figure 3:
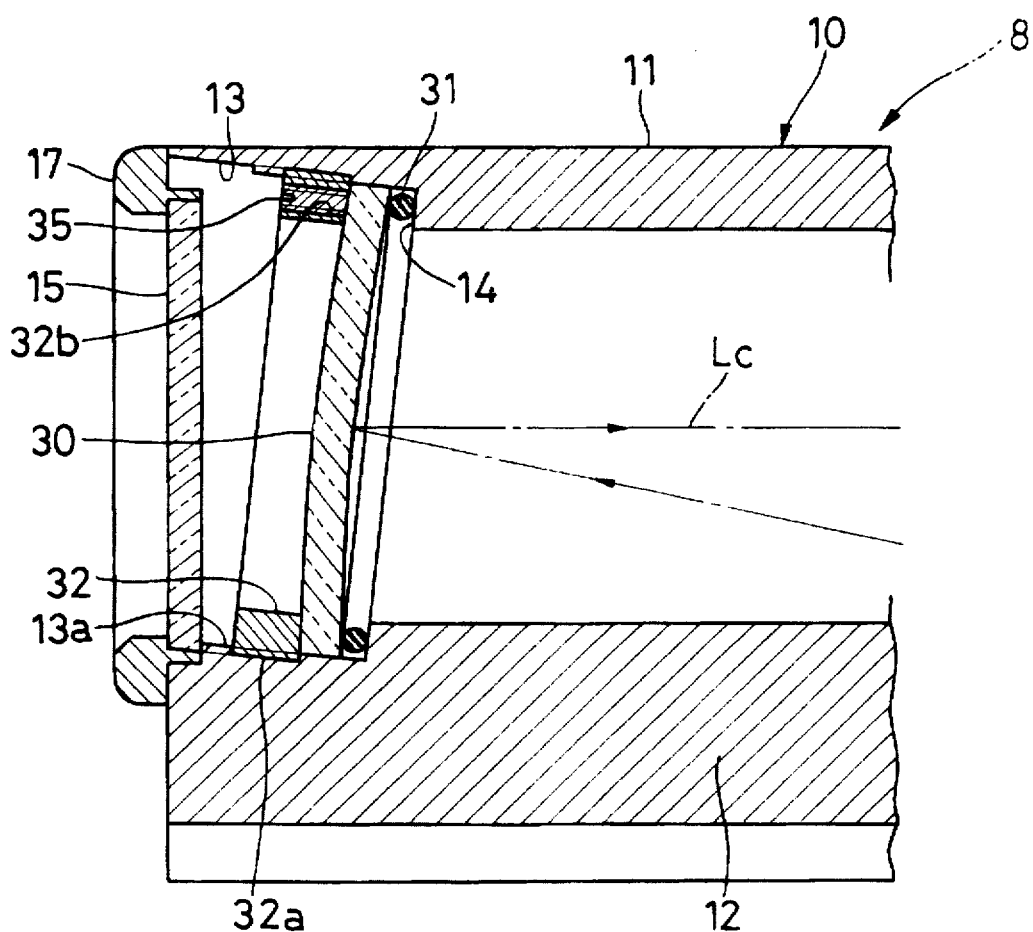
FIG. 3 is an enlarged vertical sectional view of a main part of the sight scope of FIG. 1.
Figure 4:
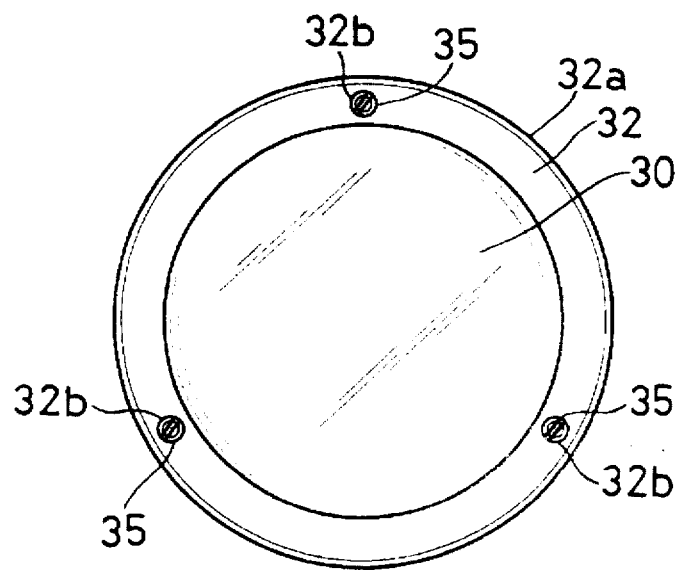
FIG. 4 is a front view of an adjusting mechanism to be employed in the sight scope of FIG. 1.

As best shown in FIG. 3, a receiving recess 13 is formed in the cylindrical portion 11 on the objective side. The receiving recess 13 has a circular configuration in section, and its axis is inclined relative to the axis of the cylindrical portion 11. An opening of the receiving recess 13 is overlapped with the opening of the cylindrical portion 11 on the objective side. The receiving recess 13 has an annular step 14 formed on an innermost part thereof. This step 14 is formed on the boundary between an inner periphery of the receiving recess 13 and an inner periphery of the cylindrical portion 11.

A semitransparent concave mirror 30 is received in the receiving recess 13. This concave mirror 30 is inclined relative to the axis of the cylindrical portion 11. A mechanism for adjusting the inclination of the concave mirror 30 will now be described in detail. A resilient ring 31 made of robber or the like is interposed between the step 14 at the innermost part of the receiving recess 13 and the concave mirror 30. A support ting 32 facing with a surface of the concave mirror 30 on the objective side is received in the receiving recess 13. A female thread portion 13a is formed in the inner periphery of the receiving recess 13. A male thread portion 32a threadingly engageable with the female thread portion 13a is formed on an outer periphery of the support ring 32.

Three threaded holes 32b are equally spacedly formed in the support ring 32 in its circumferential direction. An adjusting screw 35 is threadingly engaged in each threaded hole 32b. Distal ends of the three adjusting screws 35 slightly project from the support ring 32 and are in contact with a peripheral edge portion of the concave mirror 30. Accordingly, the positions of the distal ends of the three adjusting screws 35 can determine the inclination of the concave mirror 30.

The work for attaching the concave minor 30 and the work for adjusting the inclination will now be described in more detail. Those works are performed before the transparent plates 15 and 16 are secured to the cylindrical portion 11. The work for attaching the concave mirror 30 will be described first. The resilient ting 31 and the concave mirror 30 are received in the receiving recess 13 in this order. Then, the support ring 32 is threaded into the receiving recess 13. As a consequence, the concave mirror 30 is pushed directly by the support ring 32, and the resilient ring 31 is resiliently deformed. The concave mirror 30 is stably supported between the resilient ring 31 and the support ring 32 under the resiliency oft he resilient ring 31. The adjusting screws 35 are preliminarily threaded into the threaded holes 32b of the support ring 32 respectively, but distal ends of the adjusting screws 35 do not project towards the concave mirror 30 from the support ring 32.

When the support ring 32 reaches one end of the female thread portion 13a of the receiving recess 13, the threading operation of the support ring 32 is finished and the work for attaching the concave mirror 30 is also finished.

Then, the work for adjusting the inclination of the concave mirror 30 is performed. The distal ends of the three adjusting screws 35 are caused to project slightly from the support ring 32. By this, the surface of the concave mirror 30 on the objective side is slightly separated from the support ring 32 and contacts only the distal ends of the three adjusting screws 35. In that state, the distance measuring equipment 1 is positioned away from a testing object, a laser beam is emitted towards the testing object from the oscillator 3, and the LED 20 is turned on. The light from the LED 20 passes through the through-hole 21a of the attachment 21 and then proceeds to the center of the concave mirror 30 where the light is reflected by the mirror 30 and then proceeds to the ocular side along the axis of the cylindrical portion 11 so as to be provided as an aiming point. The worker adjusts the inclination of the concave mirror 30 by selectively threading the three adjusting screws 35 such that the aiming point provided by the reflected light from the concave mirror 30 of the sight scope 8 is coincident with a mark of the laser beam appeared on the surface of the testing object. The coincidence of the aiming point with the mark of the laser beam means that an optical axis Lc of the reflected light is in parallel relation to an optical axis La of the outgoing laser beam with a high degree of accuracy.

With the use of the three adjusting screws 35, the inclination of the concave minor 30 can be adjusted in universal directions. In the state that the adjustment is finished, the concave mirror 30 is sandwiched between the distal ends of the three adjusting screws 35 and the resilient ring 31 and stably supported under the resiliency of the resilient ring 31 while maintaining the adjusted inclination.

As mentioned above, the mechanism for adjusting the inclination of the concave mirror 30 comprises the resilient ring 31 and the support ring 32, and is very simple. Therefore, cost for manufacturing the sight scope can be reduced. Further, since the adjusting work can be performed merely by selectively threading the three adjusting screws 35, it can be done easily.

The required number of the adjusting screws 35 is three or more. Since the number of the adjusting screws is three in this embodiment, the construction is simpler and the adjusting work can more easily be performed. It is an interesting alternative that four or more adjusting screws are equally spacedly arranged in the circumferential direction.

After adjustment, the support ring 32 is secured to the holder 10 and the adjusting screws 35 are secured to the support ring 32 both by adhesive, so that the support ring 32 and the adjusting screws 35 are prevented from getting loosened to maintain the adjusted inclination of the concave mirror 30.

Thereafter, the transparent plates 15 and 16 are secured to the holder 10.

General operation of the distance measuring equipment 1 will now be described briefly. First, the measurer correctly positions the distance measuring equipment 1 so that the aiming point of the sight scope 8 coincides with the object. In that state, the oscillator 3 emits a laser beam. This laser beam is reflected by the object and made incident to the receiver 4. Then, the distance is measured based on the time required for the laser beam to be made incident to the receiver 4 after it is emitted. As mentioned above, since the optical axis Lc of the light reflected by the concave mirror 30 is accurately made parallel with respect to the optical axes La and Lb of the laser beam due to adjustment of the inclination of the concave mirror 30, the laser beam can correctly be projected to the targeting object when the aiming point is made coincident with the object. As a consequence, the distance can correctly be measured.

The present invention should not be limited to the above embodiments and many changes can be made. For example, the work for adjusting the inclination may be performed in the following manner. In the first state, no adjusting screws 35 project towards the concave mirror 30 from the support ring 32. In that state, the inclination of the concave mirror 30 is adjusted by tightening one or two adjusting screws. In this case, a part of the concave mirror 30 contacts the support ring 32.

It is acceptable that the transparent plate 15 and the support ring 32 are not fixedly bonded to the holder 10 and the adjusting screws 35 are not fixedly bonded to the support ring 32. In that case, the inclination of the concave mirror 30 can be adjusted in accordance with necessity.

The sight scope may be applied to an astronomical telescope, a bird observing telescope, etc. It may also be applied to a gun, a rifle and an archery.

What is claimed is:

1. A sight scope comprising:

(a) a sleeve-like holder;

(b) a semitransparent mirror attached to said holder in such a way to be inclined relative to an axis of said holder;

(c) a light source attached to said holder at a location offset to an ocular side rather than said semitransparent mirror, light being emitted towards said semitransparent mirror from said light source, said light being reflected by said semitransparent mirror towards the ocular side generally along the axis of said holder and provided as an aiming point; and (d) an adjusting mechanism for adjusting inclination of said semitransparent mirror, said adjusting mechanism including:

(i) a receiving recess formed in an inner periphery of one end of said holder on an objective side, said receiving recess having a circular configuration in section, an axis of said receiving recess being inclined relative to the axis of said holder, said semitransparent mirror being received in said receiving recess, an annular step is formed at an innermost part of said receiving recess;

(ii) a resilient ring interposed between said semitransparent mirror and said step;

(iii) a support ring attached to said receiving recess and facing with a surface of said semitransparent mirror on the opposite side of said resilient ring, said support ring having three or more threaded through-holes equally spacedly arranged in a circumferential direction thereof; and (iv) three or more adjusting screws for threadingly engaging said three or more threaded through-holes respectively, one end of each of said adjusting screws being faced with said semitransparent mirror.

2. A sight scope according to claim 1, wherein a male thread portion is formed on an outer periphery of said support ring, a female thread portion is formed in an inner periphery of said receiving recess, and said support ring is attached to said receiving recess by being threadingly engaged with the inner periphery of said receiving recess.

3. A sight scope according to claim 1 or 2, wherein three of said threaded holes are arranged in said support ring with an interval of 120 degrees in the circumferential direction, and three of said adjusting screws are engageable in said three threaded holes respectively.

* * * * *